United States Patent Office 3,514,631
Patented May 26, 1970

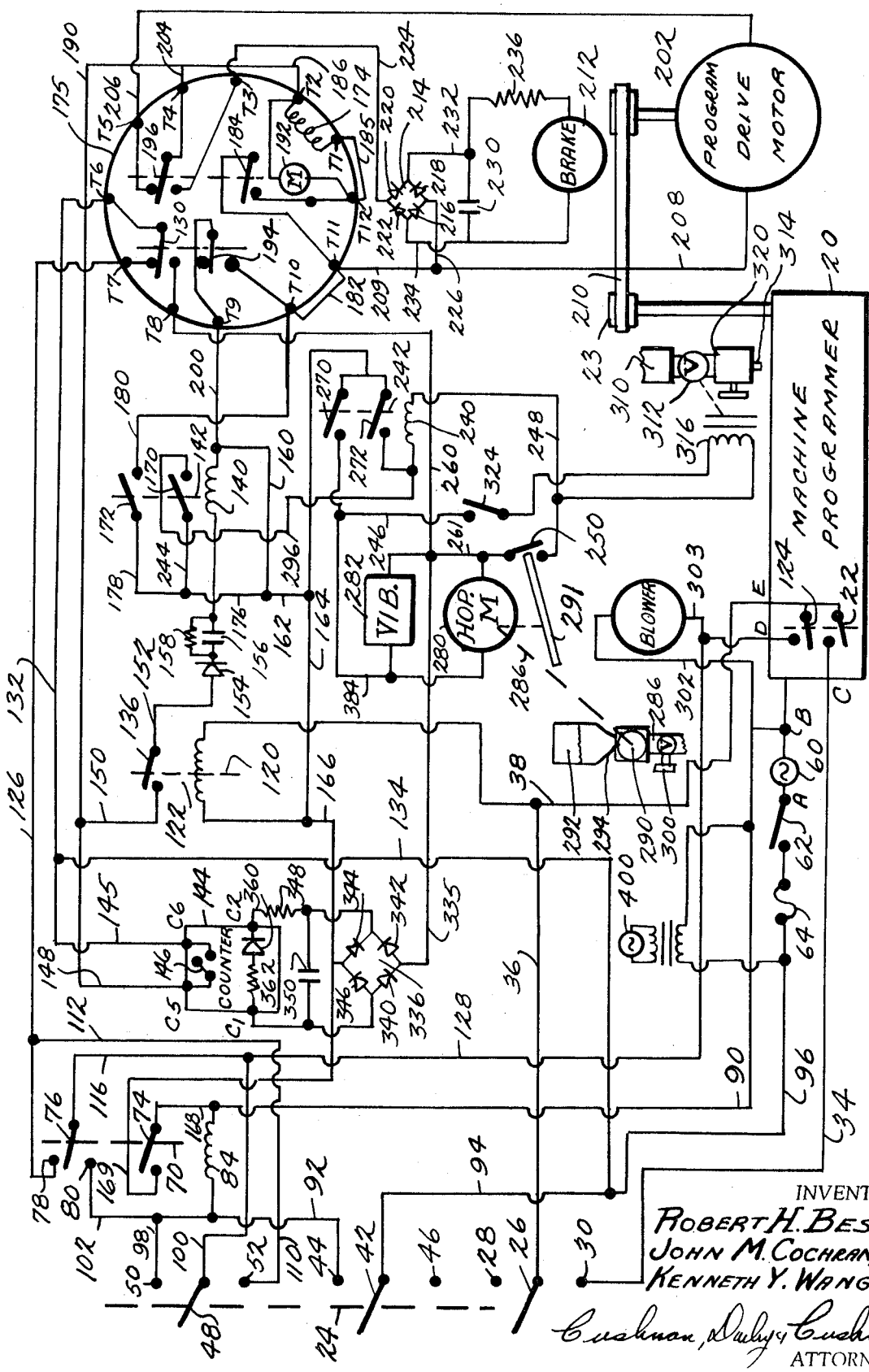

3,514,631
AUTOMATIC RECYCLING OF WASHING MACHINE AND AUTOMATIC DISPENSING OF DETERGENT
Robert H. Best, Greensboro, N.C., John Maxcy Cochran, Jr., Greenville, S.C., and Kenneth Y. Wang, Greensboro, N.C., assignors to Burlington Industries, Inc., Greensboro, N.C., a corporation of Delaware
Filed Feb. 21, 1968, Ser. No. 707,255
Int. Cl. H01h 7/14
U.S. Cl. 307—141                          4 Claims

ABSTRACT OF THE DISCLOSURE

The invention relates to apparatus for recycling a machine such as an automatic washing machine of the type which automatically performs a complete cycle comprising a number of operations in a predetermined order. A predetermined amount of liquid or solid detergent may be dispensed into the machine at the beginning of each cycle. A counter may record the number of cycles started and prevent further recycling after a predetermined number of cycles.

DESCRIPTION OF THE PRIOR ART AND SUMMARY OF THE INVENTION

Many machines including automatic washing machines are capable of performing a complete cycle of complex functions such as washing after being initially, and manually, started. Typically, this type of machine performs a number of separate operations, such as spraying, spinning, agitating, etc., either alone, or in combination with other operations, in a predetermined order, and performs each operation in a predetermined time.

The commands to which the machine is responsive in carrying out the washing cycle issue from a programming mechanism which includes a timer which may be a motor rotating a drum and a number of switches associated with that timer. Operation of such a timer is further described in Mahaffey Pat. 3,128,615 and Geldhof et al. Pat. 2,554,566. Ordinarily, the programming mechanism has a rotating knob mounted on the exterior of the machine, the position of which reflects the progress through the washing cycle. Quite frequently a push-pull on-off switch is associated with this switch so that the knob must be rotated to the correct position and the knob pulled or pushed to an operative position to begin the cycle. In many machines at the end of the cycle the knob automatically snaps back to the inoperative position, disconnecting all power from the washing machine. To begin a new cycle, the knob must be physically rotated until its position indicates that a new cycle will commence, and the knob pulled or pushed to the operative position.

An automatic washing machine may perform a number of quite different cycles, each of which is designed to be suitable for washing a specified type of material. For example, Normal, Wash and Wear, and Delicate fabrics can then be washed in a cycle which fits the need and characteristics of each type of fabric. In many washers, these different cycles can each be initiated by positioning the exterior knob in a different position.

Many situations arise in which it is desirable to drive the washing machine through a number of repeated cycles. In the testing of fabric finishes, each batch of fabrics must be washed and rewashed for a predetermined number of times. This requires the constant attention of test personnel to add detergent and manually restart each machine. In the testing of washing machines and the components thereof, it is also frequently desirable to run the machine through a large number of cycles.

This invention relates to apparatus for causing a cyclic machine, such as a washing machine, to repeat a cycle at the end of that cycle when the machine otherwise would normally stop. In addition, this invention may include an arrangement for dispensing a measured amount of solid and/or liquid detergent into the machine at the beginning of each cycle. Furthermore, the invention may include as another feature a cycle counter, which preferably can be set to any predetermined number, for automatically preventing further recycling of the machine after the machine has performed that number of cycles. The invention also contemplates the recycling equipment in combination with a cyclic machine, as well as separately.

This recycling equipment may be almost wholly external to the washing machine and can be easily adapted to operate with any standard automatic washing machine, without extensive alteration of the internal circuitry of the programming mechanism. However, the invention also contemplates a washing machine or the like with the recycling equipment built in.

Furthermore, a great deal of time and energy is conserved by the removal of the necessity for constant and close attention. After the washing machine has been started and the desired number of cycles set on the counter, the operation is entirely automatic, and requires no supervision or attention. The machines can even be started at night and allowed to run unattended.

The automatic dispensing of detergent ensures that an identical measure will be deposited in the washer at the beginning of every cycle, thereby increasing the control of the testing operation. That measure is easily adjustable so that the amount of detergent dispensed can be varied with each series of tests.

This invention then is useful for automatically recycling an automatic washing machine, and finds special utility for the testing of fabrics and washing machines. In particular, the preferred embodiment detailed in the drawing provides apparatus for dispensing detergent into the machine at the beginning of each cycle and includes a counter which prevents further recycling after a given number of cycles.

Further objects and purposes will become apparent from the detailed description of the drawing, read in the light of the accompanying drawing which shows apparatus for recycling a washing machine through a predetermined number of cycles and dispensing a predetermined quantity of detergent.

DETAILED DESCRIPTION OF THE DRAWING

Automatic washing machines ordinarily are capable of performing at least one washing cycle comprising a predetermined number of distinct operations undertaken in a predetermined order. Frequently, a number of complete and different cycles are available in automatic machines so that different types of fabrics may be washed in a manner which is most suitable for that type of fabric. For example, many washing machines have distinct cycles for washing "Normal," "Wash and Wear" or "Delicate" fabrics.

These cycles are usually accomplished by a programming mechanism which logically opens and closes switches to provide electrical excitation to the various pieces of apparatus which control the different washing functions. These switches are usually operated as a function of time, so that the washing operations are ordered and timed. In many machines this timing is performed by a motor which slowly rotates a programming mechanism or drum and indicates the passage of time on a rotating program knob connected to the drum and disposed externally of the machine. The shaft of that knob is also generally connected to an internal push-pull on-off switch, which may be used to turn the machine on and off manually during a cycle. In some washing machines that switch is used to start a cycle and complete it while in others it is normally used only to turn the machine off during a cycle due to a malfunction or otherwise.

The operation of any such washing machine is normally commenced manually by rotating the exterior program knob until the timer motor starts and the knob is positioned at the desired type of cycle. Different degrees of rotation cause different ones of the aforementioned cycles, for example, to be executed by the machine. The operations effected during the cycle are caused by completing various circuits via the program drum as it rotates. At the end of each cycle the programming mechanism automatically returns to an inoperative position, which stops the timer motor, and the machine operation ceases until manually reactivated.

In the testing of fabric finishes, each batch of fabrics must be washed and rewashed a predetermined number of times. Without the present invention, this requires the constant attention of test personnel to add detergent and manually recycle the washing machines.

The invention includes apparatus which controls the recycling of a machine such as conventional automatic washing machine so that samples may be put in the machine and washed, unattended and automatically, through as many cycles as necessary. This is accomplished in the preferred embodiment by providing an external logical circuit which preferably, in the case of a washing machine, dispenses liquid or powder detergent into the machine at the beginning of each cycle, and at the end of each cycle automatically returns the programming mechanism to a position where it must begin a new cycle.

Referring to the figure, a typical programming mechanism 20 is illustrated with an ordinary, on-off switch 22 within the programming mechanism. In ordinary washing operation this switch 22 would be closed by manually pushing or pulling the exterior knob 23 to initiate the washing cycle. However, when automatic recycling is desired this switch 22 can be disabled by manually throwing the ganged switch 24 to the automatic position in which each of the three switches 26, 42 and 48 touch the lower contacts 30, 46 and 52 respectively. This results in the switch 26 being shifted from the contact 28 to the contact 30, thereby completing an alternate current path bypassing switch 22. This path runs from the terminal C along line 34 to contact 30 and through switch 26 to line 36 which connects to the washing machine programming terminal E via line 38. Ganged switch 24 when moved from manual to automatic position also shifts the positions of switch 42 from contact 44 to contact 46 and switch 48 from contact 50 to contact 52 when it is manually thrown to automatic. These switches 26, 42 and 48 connect the recycling apparatus to the programming mechanism.

The source 60 of 120 volts AC, for example, supplies power for the washing machine and the recycling apparatus. A power switch 62 acts as a second on-off switch and must be closed before recycling operation can commence. The fuse 64 provides a measure of safety against electrical malfunctions in the programming mechanism or the recycling apparatus.

The relay 70 is activated, opening switch 74 and shifting switch 76 whenever manual operation is desired and switch 42 is touching contact 44, thereby completing a current path through the coil 84 of the relay 70 from the terminal B of source 60 to the coil 84 via line 90 and through the coil 84 and back to terminal A of source 60 via line 92, contact 44, switch 42, lines 94 and 96, fuse 64 and power switch 62.

The relay 70 serves to parallel the switch 48 and thereby decreases the current flow through switch 48, increasing the lifetime of switch 48. When the ganged switch 24 is thrown to the manual position so that switch 48 connects lines 98 and 100 and switch 42 connects lines 92 and 94, relay 70 is activated, shifting switch 76 from contact 78 to contact 80, and thereby also connecting lines 98 and 100 via line 102, switch 76 and line 104. When the ganged switch 24 is thrown to the automatic position, switch 48 connects lines 110 and 100 and relay 70 is not activated. Therefore, when switch 48 connects lines 100 and 110, a path through line 112, switch 76 and line 116 also connects lines 110 and 100.

To commence operation of many types of machines, including washing machines, a programming knob 23 must be manually rotated until it is positioned so as to begin the type of cycle desired. The ganged switch 24 then is thrown to the automatic position, disabling the push-pull on-off switch 22 as well as connecting the recycling apparatus to the programming mechanism 20. Master switch 124 inside the programming mechanism is closed only while the washing machine is operating and connects terminal E to terminal D. Terminal D is electrically connected to the line 126 via two parallel paths, one leading through lines 128 and 100, switch 48 and lines 110 and 112 and the other following lines 128 and 116, switch 76 and line 114. Line 126 is in turn connected to terminal A of source 60 through timer contact T7, switch 130, timer terminal T6, lines 132, 134 and 96, fuse 64 and power switch 62. Since terminal E is not linked to the D terminal through master switch 124 a complete current path is not established through the coil 120 and the switch 136 remains in its normally closed position. The closed switch 136 then completes a current path through the relay coils 140 of the relay 142 after the power switch 62 is closed provided that the decrementing counter 144 has not yet reached a counter of zero.

Before the power switch 62 is closed, and the ganged switch 24 through to the automatic position, the counter 144 is manually set to a number which corresponds to the number of times that the washing machine is to repeat a given cycle. Each time the programming mechanism indicates a cycle has been completed, a pulse is applied between terminals C1 and C2 of which counter 144 results in decrementing the count by one. As long as the counter registers any number except zero, switch 146 remains closed, electrically connecting terminals C5 and C6. However, when the counter reaches the count of zero, switch 146 opens, preventing further recycling of the washing machine.

If switch 146 is closed, closed switch 136 completes a current path through the coil 140 of another relay 142, from terminal A of source 60 through fuse 64 and power switch 62, lines 96, 134 and 145, closed switch 146, lines 148 and 150, closed relay switch 136, line 152, diode 154, capacitor 156 and resistor 158, coil 140, lines 160, 162, 164, 166, and 169, switch 74 and lines 168 and 90 to terminal B of source 60. When this current, rectified by diode 154, is first applied to coil 140, capacitor 156 is uncharged and passes the initial rectified pulse without attenuation. However, because diode 154 produces a direct current voltage, capacitor 156 soon charges through resistor 158 to the rectified voltage and blocks the passage of further current through coil 140 of relay 142. Therefore relay 142 will close switches 170 and 172 only momentarily until capacitor 156 is charged sufficiently to block the passage of further current, opening switches 170 and 172.

The closing of switch 172 provides a momentary current path through clutch coil 174 located inside timer 175. This current path leads from the B terminal of source 60 through lines 90 and 168, switch 74, lines 169, 166, 164, 162, 176 and 178, closed switch 172, and line 180 to terminal T10 of timer 175. Terminal T10 is connected to the terminal T11 via line 182, and terminal T11 to T12 through switch 184 which is now closed. Terminal T12 is connected to terminal T1 through line 185. The path returns to terminal A of source 60 through coil 174, via lines 186, 190, and 148, switch 146 and lines 145, 134 and 96, fuse 64 and power switch 62. A motor coil 192 within timer 128 spans terminals T2 and T12 and is activated by the same current path that flows through coil 174 since terminal T12 is connected to T1 by line 185. The passage of current through clutch coil 174 operates timer switches 130 and 194, shifting switch 130 from connecting terminals T6 and T7 to connecting terminals T6 and T8, and closing the normally open switch 194 to connected terminals T9 and T10. However, the passage of current through coil 192 will not cause switch 196 to disconnect terminals T4 and T5 and connect terminals T4 and T3, and switch 184 to disconnect terminals T11 and T12 until the time set on the timer 175 has elapsed.

The closing of the switch 172 then activates the motor coil 192 and clutch coil 174. However, both coils, 174 and 192, will remain activated even after the switch 172 has opened since the closing of switch 194 creates another current path through both coils via lines 90 and 168, closed switch 74, lines 169, 166, 164, 162, 160, 200, terminal T9, closed switch 194, terminal T10, line 182, terminal T11, switch 184, terminal T12, through motor coil 192 or through clutch coil 174 via line 185, lines 186, 190, 148, closed switch 146, lines 144, 134, and 96, fuse 64 and power switch 62. Both coils will then remain activated until switch 184 is opened, which occurs shortly after the set time has elapsed.

The closing of switch 172 and the subsequent closing of switch 194, complete a current path through the program drive motor 202 which is interrupted only by the shifting of switch 196 from terminal T5 to T3 at the end of the set time period. This path leads from terminal A of source 60 through power switch 62, fuse 64, lines 96, 134 and 144, closed switch 146, lines 148, 190 and 204, switch 196, line 206 and through the program drive motor to terminal B of source 60 via lines 208, 209 and 182, closed switch 194, lines 200, 160, 162, 164, 166, 169, closed switch 74 and lines 168 and 90.

When current flows through the program drive motor 202, it operates to turn the knob 23 through a drive chain 210. By setting the timer 175 so that switch 196 will shift from terminal T5 to T3 after a given time, the time that the program drive motor operates can be predetermined. Hence the angular rotation of the knob 23 can be determined and the time chosen so that the knob 23 is returned to a position where it must begin a new cycle.

When the time set has elapsed, switch 196 shifts from terminal T5 to terminal T3 thereby interrupting the current path through the program drive motor 202 which then ceases to rotate the knob 23. The movement of switch 196 to terminal T3 also activates a brake 212 which stops the program motor 20 abruptly, thereby preventing any possibility of the motor 202 coasting the knob 23 past the desired position. The movement of switch 196 to terminal T3 applies the voltage of source 60 across a full wave rectifier 214 composed of diodes 216, 218, 220 and 222 via a path from terminal A through switch 62, fuse 64, line 96, 134 and 144, closed switch 146, lines 148, 190, 204, switch 196, and line 224 and from terminal B via lines 90 and 168, switch 74, lines 169, 166, 162, 160, 200, closed switch 194, and lines 182, 209, and 226. The direct voltage from rectifier 214 is applied to a capacitor 230 via lines 232 and 234 and then to the brake 212 via resistor 236.

The switch 184 opens at a predetermined and adjustable time after the movement of switch 196 to terminal T3. The opening of switch 184 interrupts the current path through both coils 192 and 174 with the result that switch 194 opens, interrupting the current path to the rectifier 214, and switch 130 shifts back in contact with terminal T7.

The closing of switch 170, at approximately the same time that switch 172 closes, completes a current path through coil 240 of relay 242. This path leads from terminal A through switch 62, fuse 64, lines 96, 134 and 132, terminal T6, switch 130, terminal T8, lines 260 and 261, switch 250, line 248, coil 240, line 296, switch 170, lines 244, 176, 162, 164, and 169, switch 74, and lines 168 and 90 to terminal B. The passage of current through coil 240 closes switches 270 and 272. The closing of switch 272 completes a parallel path around switch 170 so that current continues to path through coil 240 after switch 170 opens.

The closing of switch 270 further completes a current path through a hopper motor 280 and a hopper vibrator 282. The switch 62, fuse 64, lines 96, 134 and 132, switch 130 and line 260 connect terminal A to the hopper motor 280 and vibrator 281, and lines 90 and 168, switch 74, lines 169, 166 and 164, switch 270 and line 284 connect terminal B to the other side of motor 280 and vibrator 281. Hopper motor 280 is connected via a drive shaft 286 to a rotating hollow core 290. An arm 292 also is attached to the drive shaft and is positioned so as to physically and momentarily open switch 250 at the end of a single rotation or a part or multiple thereof, interrupting thereby the only current path through relay coil 240, and thereby opening relay switches 270 and 272. The momentum of the motor pulls arm 292 past the position where it opens switch 250, reclosing switch 250 after switches 270 and 272 are opened, preparing the dispensing apparatus for the next operation. The current cannot resume through coil 240 since the opening of switch 272 also interrupts the current path.

Hollow core 290 may be constructed so as to contain any given volume of detergent and to dispense that volume once upon each rotation. The core picks up soap powder from a hopper 292 through a slot 244 and dumps that same powder into a tube 296 which leads directly into the washing compartment of the machine. The tube is equipped with a hand valve 300 which can be manually closed to prevent dispensing of solid detergent if, for example, only liquid detergent was to be dispensed. Hopper vibrator 282 serves to shake the powder in hopper 292 and to prevent moisture from congealing the powder into a solid mass. A blower 301 which is located near hopper 292 is energized to blow air to remove moisture from the outer surface of the core 290 and associated hopper parts whenever the ganged switch is thrown to an automatic position via lines 302, 303, 128, 100, 110, 94, 96, fuse 69 and switch 62.

Liquid detergent may also be dispensed into the washing machine from a storage container 310. A solenoid valve 312 opens to allow the liquid detergent to flow by gravity through the tube 314 when current passes through the coils 316. Current flows through the coils 316 when the closing of switch 270 completes a path from terminal B, energizing hopper motor 280. The time which the valve 312 remains open can be determined by allowing the same hopper motor 280 to rotate the arm 292 to open the switch 250, or by an independent timer maintained so as to deactivate the coils 240 of relay 242 after a given time (not shown). A manual valve 320 further serves to control the rate of flow through the pipe 314 and allows a given amount of detergent to be dispensed in any given time. A manually operated switch 324 can be opened to prevent dispensing of the liquid detergent. Both liquid and solid detergent can be simultaneosuly dispensed or either can be dispensed alone by opening switch 324 or closing valve 300.

The passage of current through coil 174 within timer 175 also connects terminals T6 and T8 through switch 130, resulting in a pulse of voltage being applied to terminals C1 and C2 of the counter 144 from terminal A via power switch 62, fuse 64, lines 96 and 134, switch 130 and lines 260 and 335, to the full wave rectifier 336, composed of diodes 340, 342, 344, 346, and then to terminal B via line 169, switch 74 and lines 168 and 90. This rectified voltage is then applied to a smoothing capacitor 350 and to the terminals C1 and C2 via a resistor 348. A diode 360 and a resistor 362 between the terminals C1 and C2 prevents current from actually passing between terminals C1 and C2. This pulse of voltage applied to terminals C1 and C2 decrements the counter by one and in effect records the completion of one washing cycle.

After the timer 128 has returned to its normal state and the detergent dispensed into the washer, the washing machine completes its cycle without further instructions from the external recycling apparatus. At the end of that complete cycle, switch 56 inside the programming mechanism 20 opens, interrupting the current path through the coil 120 of relay 122 which immediately closes the switch 136. A small light 400 is lit whenever current passes through the power switch 62. If the switch 146 has been opened due to the counter reaching zero at the position of the last cycle, no current pulse can pass through coil 140 and operation ceases. If the switch 146 is still closed, the program motor 202 is again operated to reposition the manual switch 23, and detergent is dispensed into the washing machine as previously described. This recycling will continue until the counter opens switch 146 and prevents further operation.

The relay 70 in addition to paralleling switch 48, also prevents recycling of the machine if the counter has been inadvertently left on and the ganged switch 24 thrown to manual position. The relay 70 will be activated whenever the switch 48 touches contact 52, opening switch 74. Since switch 74 is a part of the only current path through relay coils 120 and 140 the recycling can not occur unless the ganged switch 24 is thrown to the automatic position.

Summarizing the operation of the recycling apparatus, the ganged switch 24 is thrown to the automatic position connecting switches 26, 42 and 52 to contacts 30, 46 and 52 respectively. The counter 144 is then set to the number of cycles desired and the knob 23 manually rotated to the off position of the type of cycle desired. Since the master switch 124 remains open, the relay 122 cannot be energized and the switch 136 remains in its normally closed position, allowing a voltage pulse to be applied to the coil 140 of the relay 142, closing switches 170 and 172.

The closing of switch 172 then completes a current path through the clutch coil 174 and the motor coil 192 resulting in the closing of switch 194 and the shifting of switch 130 from terminal T7 and T8. The closing of switch 194 creates another current path through both coils so that they remain energized even after switch 172 opens. The closing of switch 172 and then switch 194 also provides excitation for the program drive motor 202 which rotates the knob 23. After the set time has elapsed the switch 196 shifts from terminal T5 to T3 interrupting the excitation for the program drive motor 202 and energizing a brake 212. A short time after switch 196 opens, switch 184 opens preventing current from flowing through either coil 174 or 192.

The closing of switch 170 completes a current path through coil 240, closing switches 270 and 272. Closed switch 272 creates another path through coil 240 so that relay 242 remains energized after switch 170 opens. The closing of switch 270 further energizes a hopper motor 280 which rotates a hollow cup or container 290 to dispense solid detergent into the washing machine. An arm 292 on the motor 280 opens a switch 250 deenergizing relay 242 after a single rotation. Liquid detergent may also be dispensed by closing switch 270 and energizing thereby coil 316.

The movement of switch 130 to terminal T8 applies a pulse of voltage to the counter 144 which decrements the count by one. When the count reaches zero the counter opens switch 146, thereby preventing further energization of relay 142.

After the washing machine completes a cycle, switch 124 opens interrupting the current path through coil 120 and allowing switch 136 to return to its normally closed position. Current then flows through coil 140 as described above and recycling occurs.

This embodiment of the invention is merely one example and many changes and modifications are possible without departing from the spirit of the invention. Accordingly, the scope of the invention is limited only by the scope of the appended claims.

What is claimed is:

1. Apparatus for recycling a washing machine of the type which automatically performs a complete washing cycle comprising a predetermined number of operations in a predetermined order and which has a programming mechanism which causes said machine to begin said cycle when said mechanism is in a first position and to end said cycle when said mechanism is in a second position, said apparatus comprising:

a counter which totals the number of cycles completed and prevents said recycling after a predetermined number of completed cycles;

means for dispensing a predetermined quantity of detergent into said machine at the beginning of each said cycle;

a motor adapted to mechanically return the position of said program mechanism to said first position to cause said machine to begin another cycle; and means for operating said motor to cause said mechanism to return when said mechanism is in said second position.

2. Apparatus as in claim 1 wherein said dispensing means dispenses solid detergent and includes a hopper adapted to contain a supply of said detergent, a hollow core adapted to receive a quantity of detergent from said hopper, the amount of said detergent received being dependent upon the volume of the hollow portion of said core, a hopper motor adapted to rotate said core to first cause said core to receive said detergent and then to dispense said detergent into said machine, a hopper vibrator adapted to vibrate said hopper, and switching means associated with said motor to disable said hopper motor after said core has rotated through a predetermined angle.

3. Apparatus as in claim 1 wherein said dispensing means dispenses liquid detergent and includes a container housing said detergent, a valve operable to allow said detergent to flow into said machine, adjustable valve means for regulating the rate of flow of said detergent, and means for rendering said valve inoperable after a predetermined time.

4. Apparatus for recycling a washing machine of the type in which a programming mechanism automatically causes said machine to perform a complete washing cycle comprising a predetermined number of operations in a predetermined order when said mechanism is in a first position and causes said machine to end said cycle when said mechanism is in a second position said apparatus comprising:

a first relay circuit activated by said machine when said mechanism is in said second position;

a second relay circuit activated by the activation of said first relay;

a timer activated for a predetermined length of time after said second relay is activated;

a motor operable to return said mechanism to said first position when said timer is activated;

a dispensing mechanism, activated by said second relay for dispensing said detergent; and a counter adapted to record the number of times said timer is set and to prevent the activation of said second relay after said count reaches a predetermined number.

References Cited

UNITED STATES PATENTS

| | | | |
|---|---|---|---|
| 3,223,108 | 12/1965 | Martz | 68—12 X |
| 3,325,657 | 6/1967 | Corey | 307—141 X |
| 3,398,295 | 8/1968 | Fathauer | 307—141.4 |
| 3,424,920 | 1/1969 | Jones et al. | 307—141 |

ROBERT K. SCHAEFER, Primary Examiner

T. B. JOIKE, Assistant Examiner

U.S. Cl. X.R.

68—12